United States Patent [19]

Gallagher

[11] Patent Number: 4,659,043
[45] Date of Patent: Apr. 21, 1987

[54] RAILROAD HOT BOX DETECTOR

[75] Inventor: Cornelius A. Gallagher, Syosset, N.Y.

[73] Assignee: Servo Corporation of America, Hicksville, N.Y.

[21] Appl. No.: 609,938

[22] Filed: May 14, 1984

Related U.S. Application Data

[63] Continuation of Ser. No. 308,263, Oct. 5, 1981, abandoned.

[51] Int. Cl.$^4$ .............................................. B61K 9/04
[52] U.S. Cl. ........................... 246/169 A; 246/169 D; 246/DIG. 2; 340/57; 340/584; 340/682
[58] Field of Search .......... 246/169 R, 169 A, 169 D, 246/DIG. 1, DIG. 2; 116/DIG. 38; 308/1 A; 340/57, 584, 682; 374/124

[56] References Cited

U.S. PATENT DOCUMENTS

| | | | |
|---|---|---|---|
| 2,880,309 | 3/1959 | Gallagher et al. | 246/169 R |
| 2,963,575 | 12/1960 | Pelino et al. | 340/682 X |
| 3,629,572 | 12/1971 | Gallagher | 246/169 D |
| 3,697,744 | 10/1972 | Howell | 246/169 D |
| 3,731,087 | 5/1973 | King | 246/169 D |
| 3,812,343 | 5/1974 | Gallagher et al. | 246/169 D |
| 4,256,278 | 3/1981 | Sanville | 246/169 D X |
| 4,313,583 | 2/1982 | Bambara et al. | 246/169 A |
| 4,323,211 | 4/1982 | Bambara et al. | 246/169 D X |

Primary Examiner—Randolph A. Reese
Attorney, Agent, or Firm—Kane, Dalsimer, Kane, Sullivan and Kurucz

[57] ABSTRACT

A hot box detector system is provided wherein heat signals from bearings within a housing are analyzed to determine if the scanned surface of the housing is an inner sidewall surface or an outer sidewall surface. The signals are normalized to account for differences in the heat dissipating characteristics of the inner and outer sidewalls and air stream cooling resulting from the trains movement.

7 Claims, 4 Drawing Figures

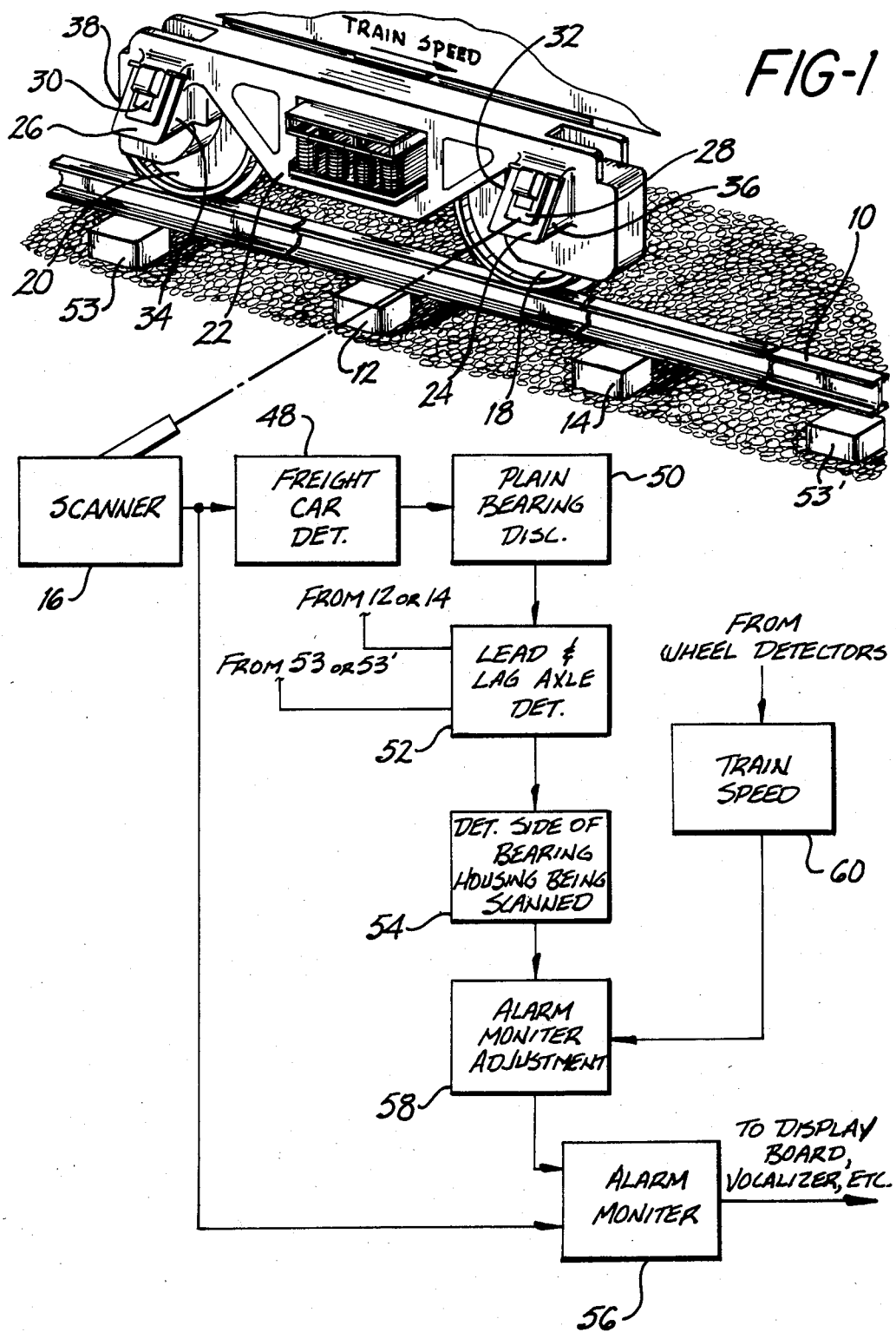

SCANNER OUTPUT SIGNAL FOR A DOUBLE TRUCK CAR MOVING IN THE DIRECTION OPPOSITE TO THAT SHOWN IN FIG.1

SCANNER OUTPUT SIGNAL FOR A DOUBLE TRUCK CAR MOVING IN THE DIRECTION SHOWN IN FIG.1

RAILROAD HOT BOX DETECTOR

BACKGROUND OF THE INVENTION

The present application is a continuation of application Ser. No. 308,263 filed Oct. 5, 1981, now abandoned.

The present invention relates to railroad car hot box detectors and more particularly to a unique system for treating the heat signal generated by such detectors.

In order to protect against railroad car wheel bearing failure, most railroads utilize hot box detectors along their rights of way to view, through infra-red scanners, the bearings of railroad cars as they pass through a sensing zone. If an overheated bearing is detected, some type of alarm is triggered to alert the engineer to stop the train and correct the potentially dangerous situation which, if allowed to continue, could result in a train derailment. While it is extremely important that no overheated bearings (i.e., hot boxes) be missed by the hot box detector, it is almost equally important that no false alarms be generated since the unscheduled stopping of a train is a costly and time consuming operation that could result in substantial disruptions of schedules.

The infra-red scanner and associated circuits for detecting overheated bearings are highly developed and available commercially from such sources as the Servo Corporation of America of Hicksville, N.Y. The equipment is disclosed, for example in U.S. Pat. Nos. 3,545,005; 3,454,758; 3,812,343; 3,872,456 and 4,113,211.

Heretofore, hot box detector systems of the type described in the above patents and those available commercially have been designed to safely detect hot boxes for trains passing a scanning site under a wide variety of different conditions without regard to the specific train conditions. Thus, the systems described above are designed so that they operate to process signals the same way whether the signal is generated from a train proceeding along at five miles an hour or from a high speed train moving at speeds that can exceed 100 miles per hour.

As pointed out in the above-mentioned patents, railroad freight cars in the United States usually have one of two types of bearings, plain bearings or roller bearings. Although plain bearings account for only approximately 16% of the effective rolling stock in the United States, the problems associated with the accurate analysis of signals from plain bearings are of particular importance to the railroad industry since in 1980 plain bearings accounted for 74% of derailments. Because of different operating characteristics of the different types of bearings, the waveform of the infra-red scanner signal must be analyzed to permit proper bearing identification and proper alarm criteria must be set depending on the type of bearing imaged. For purposes of the present discussion, the principal difference between roller and plain bearings which leads to problems in scanner signal analysis is that the portion of the plain bearing exposed to the infra-red scanner imaging spot is contained within a housing whereas the roller bearing is viewed directly by the scanner. The plain bearing housing, which protrudes from the car truck frame and is affixed to the frame, serves to siphon off some of the temperature rise of an operating bearing and dissipate it through the truck frame. Since a pair of bearing housings are usually provided on each truck frame, located toward the ends of the frame, the surfaces of the housing facing each other (i.e., the housing inner sidewall surfaces) dissipate more heat than the surfaces of the housing facing away from each other (i.e., the housing outer sidewall surfaces). Since it is these inner and outer housing sidewall surfaces which are imaged by the hot box detector scanner, resultant signals from the scanner depend on which surface of the housing is imaged.

In addition to the above, since the housing protrudes from the truck frame, the leading surface of the housing is exposed to the cooling effect of the air stream generated by virtue of the train movement while the lagging surface is minimally effected by the air stream. The leading and lagging surfaces may be the inner or outer housing sidewall surface depending on the direction of movement of the train. Roller bearings are not subjected to these problems since roller bearings are directly imaged and they are in rotation during imaging.

As a result of the above, the accurate early detection of overheated plain bearings has been extremely difficult.

The principal object of the present invention is to provide an improved hot box detector system which can more accurately sense an abnormal temperature rise in a plain bearing than has heretofore been possible.

A further object is to provide such a system which utilizes, to a great extent, conventional components.

A still further object is to provide such a system which may readily be retrofitted into existing hot box detector systems and is compatible with such systems.

Still further objects and advantages will become apparent from the following description of a preferred embodiment of the invention.

SUMMARY OF THE INVENTION

The above and other beneficial objects and advantages are attained in accordance with the present invention by providing a railroad car hot box detector system which utilizes a conventional infra-red responsive scanner to successively scan the bearings of railroad cars passing along a section of track with means for determining if the surfaces being scanned dissipate heat differently from bearing to bearing and for adjusting the means for processing the scanner signal as a function of the heat dissipating qualities of the surfaces.

In a preferred embodiment the system determines if a scanned bearing is within a housing and, if so, if the sidewall of the housing imaged by the scanner is an inner sidewall surface or an outer sidewall surface. The system also determines if the sidewall surface is a leading surface or lagging surface with respect to the air stream caused by movement of the train.

BRIEF DESCRIPTION OF THE DRAWINGS

In the accompanying drawings:

FIG. 1 is a block diagram representation of the overall system of the present invention;

DETAILED DESCRIPTION OF THE PREFERRED EMBODIMENT

Figure 2B:
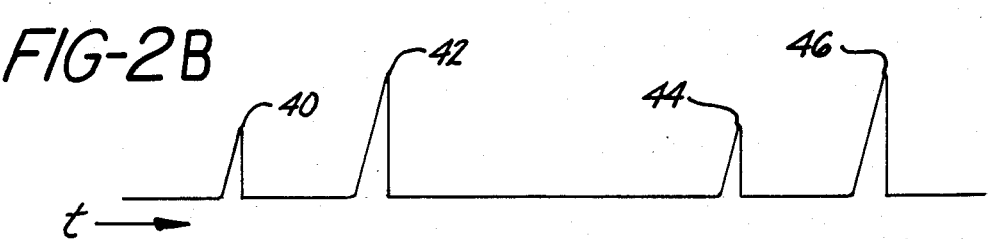
FIG. 2b is a simplified waveform similar to FIG. 2a for a freight train moving in the direction opposite to that indicated in FIG. 1; and, FIG. 3 is a plot of time vs. temperature rise as determined from the inner and outer housing sidewall surfaces.

Reference is now made to the drawings and to FIG. 1 in particular wherein a section of track 10 is depicted along which wheel sensors 12 and 14 are mounted. A radiant energy scanner 16, such as an infra-red hot box detector disclosed in U.S. Pat. No. 3,545,005 is positioned along the track to scan each passing railroad car as the wheels of the car pass through the sensing zone defined by wheel sensors 12 and 14. The scanner 16 is focused to image on the bearings of each passing wheel. In practice, a pair of scanners is usually provided mounted on opposite sides of the track with each scanner imaging on the bearings on its side of the track. The wheel sensors 12 and 14 and infra-red scanner 16 are all of conventional design and are commercially available from sources such as the Servo Corporation of America of Hicksville, N.Y. In operation, the wheel sensors 12 and 14 serve to generate a signal each time a wheel passes which together define a time interval during which the scanner 16 serves to generate an analog waveform indicative of the heat of the bearing scanned.

Thus, as each of the wheels 18, 20 of each truck 22 of each car of the train pass through the sensing zone, a heat pulse (such as those shown in FIG. 2) is generated. Between trucks the scanner 16 views the under-carriage or bottom of the passing car and between cars the scanner may get a glimpse of the sky.

The problem with which the present application is concerned is peculiar to those bearing which are not exposed directly to the imaging spot of scanner 16 but which must be imaged indirectly through a bearing housing. In FIG. 1, truck 22 is provided with plain bearings which are located in housings 24 and 26 mounted at the ends of truck 22. The housings 24 and 26 protrude from the truck frame and serve to contain a quantity of oil to lubricate the bearing. The oil is fed through covers 28, 30 in the housings. As the housings pass the scanner 16, scanner 16 images on either the inner sidewalls 32, 34 of housings 24, 26 or the outer sidewalls 36, 38 depending upon the direction of movement of the train and orientation of the scanner.

Figure 2A:
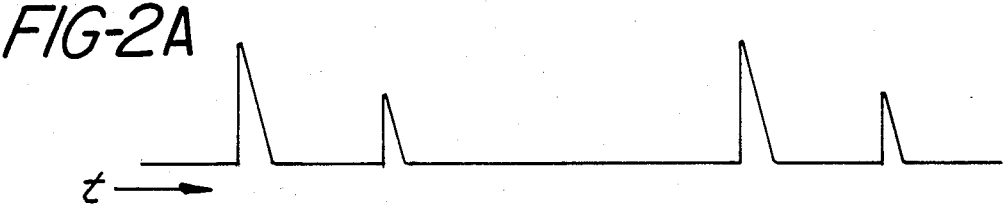
FIG. 2a is a simplified waveform diagram of the heat signal generated by the passing of a freight car provided with plain bearings through a sensing zone moving in the direction indicated in FIG. 1.

The inner sidewalls 32, 34 are those sidewalls which face each other and the spring nest of truck. The outer sidewalls 36, 38 are directed away from each other. As can be seen in FIG. 1, the inner sidewalls 32, 34 are contiguous to the large heat conducting mass comprising the main portion of the truck frame while the outer surfaces 36, 38 are not. As a result, more of the temperature rise of an overheated bearing within a housing 24, 26 would manifest itself on the outer sidewalls 36, 38 than on the inner sidewalls 32, 34. It should also be noted from FIG. 1 that regardless of train movement direction or scanner orientation each truck must have one housing imaged on an inner sidewall and the other housing imaged on an outer sidewall. This is shown in FIG. 2 wherein the pulse 40 is generated as a result of the bearing for wheel 18, pulse 42 is generated as a result of the bearing for wheel 20 and pulses 44 and 46 are generated by the bearings of the nex truck when it passes through the sensing zone. Had the train been moving in the opposite direction, the initial surface imaged by the scanner would have been an outer sidewall surface resulting in the waveform distribution of FIG. 2b.

Figure 3:
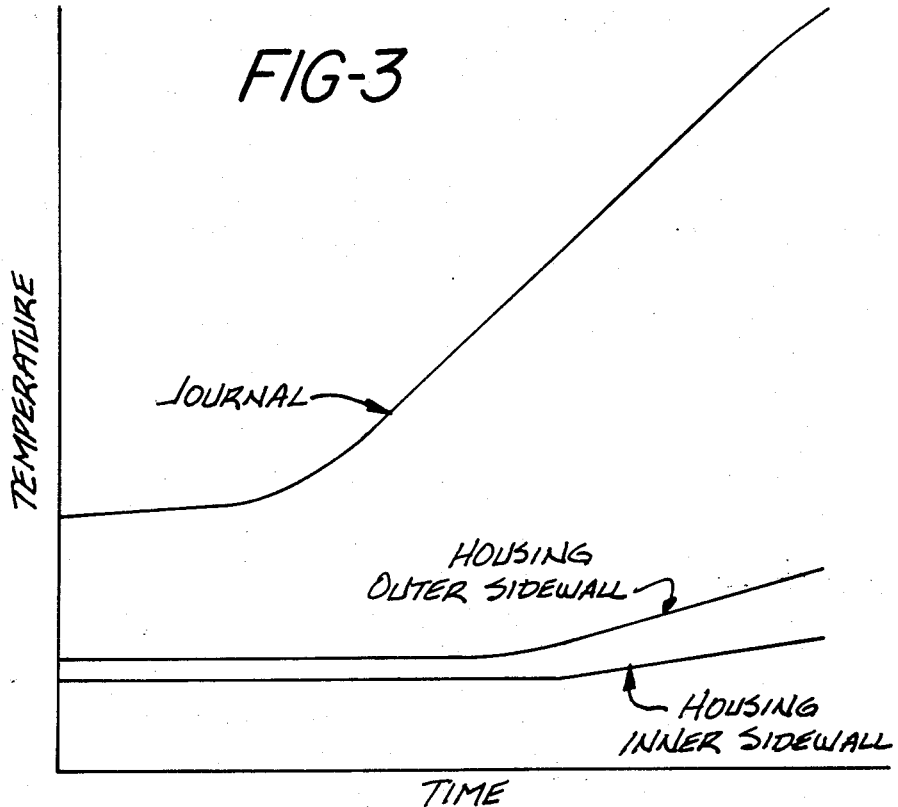

In FIG. 3 a graph of temperature rise vs. time is presented for a deliberately generated hot box in a plain bearing. As may be seen, the inner sidewall temperature rises are approximately 30% lower than on the outer sidewall.

In accordance with the present system, the output of scanner 16 is first fed to a discriminator 48 which determines if the truck under investigation is a freight truck (since plain bearings are only used on freight trucks). Such discriminators are disclosed, for example, in U.S. Pat. No. 4,256,278. If it is determined that a freight truck is under observation, it must next be determined whether the freight truck has plain bearings or roller bearings. This is done in discriminator 50 which relies on well known differences in the characteristic waveforms generated. The leading and lagging axle of each truck is then determined in block 52 by the sequence of wheel sensor signals for each truck. In this regard additional wheel sensors 53 and 53' are utilized in the manner disclosed in the aforementioned U.S. Pat. No. 4,256,278. Once the direction of the train is determined (which may readily be done by observing the sequence of activation of the wheel sensors or based on the determination of which axle of a truck is the leading axle and which is the lagging axle) the side of the bearing housing being scanned is determined in block 54. This determination may readily be made based on (1) whether scanner 16 is looking forward or backwards at a particular train and (2) the direction of the train. Thus, for a forward looking scanner (as shown in FIG. 1) the inside surface 32 of housing 24 would be viewed first followed by the outside surface 38 of housing 26. If the orientation of the scanner had been reversed, the outside surface 36 of housing 24 would be viewed first followed by the inside surface 34 of housing 26. An adjustment of alarm monitor 56 may then be made through block 58 to compensate for the differences in the heat dissipating characteristics of the sidewalls of the housing.

Since the housings 24 and 26 protrude from the truck frame 22 they are subject to exposure to an air stream caused by motion of the train. The air stream cooling effect is particularly noticeable when the train motion is oncoming to the scanner aperture (i.e., if scanner 16 were directed in the opposite direction or train motion were opposite to that shown in FIG. 1). The speed of the train and hence the magnitude of the air stream effect may readily be determined by use of a speed detector 60 which obtains inputs from a pair of sensors spaced a fixed distance apart in accordance with well known procedures. Since the lead and lag axle as well as the housing side information are available from the analysis discussed above, normalization for air stream cooling may also be made in block 58.

While the above description of a preferred embodiment of this invention has been disclosed in connection with plain bearings, it should be appreciated that the invention would have application to any system wherein different surfaces of a bearing may be scanned and the heat signal generated depends on the surface imaged.

Thus, in accordance with the above, the aforementioned objects ar attained.

Having thus described the invention, what is claimed is:

1. A railroad car hot box detector system comprising:
   (a) radiant energy scanner means positioned along a section of track and adapted to scan, in a single direction along said section, surfaces associated with successively passing bearings on different axles on the same side of railroad cars passing the scanner means in either direction and to generate a signal in response to each bearing scanned;

(b) means for determining a direction of movement of said railroad cars;

(c) means for determining if the surfaces of the bearings being scanned dissipate heat generated by said bearings differently from bearing to bearing to distinguish (i) between bearings that are housed and bearings that are exposed and (ii) if the former, (a) if the surfaces of the bearings being scanned are housing inner or outer surfaces and (b) if the surfaces of the bearing being scanned are housing leading or housing lagging surfaces as defined by the direction of movement of the railroad cars;

(d) means for processing said scanner signal; and (e) means for adjusting said scanner signal processing means as a function of the heat dissipating qualities of the surface of said bearing being scanned.

2. The invention in accordance with claim 1 wherein said determining means includes means for distinguishing freight trucks.

3. The invention in accordance with claim 1 wherein said determining means further comprises means for determining the speed of said train connected to said adjusting means whereby said processing means may be further adjusted as a function of the speed of the train.

4. A railroad car hot box detector system comprising:
(a) radiant energy responsive scanner means positioned along a section of track and adapted to scan in a preselected direction the bearings of railroad cars passing the scanner means in either direction and to generate signals in a response thereto, said signals including portions thereof having an amplitude and waveform indicative of the passing of a wheel bearing, the type of bearing, the temperature of said bearing and whether or not said bearing is enclosed within a bearing housing;
(b) an alarm monitor connected to said scanner for generating an alarm in the event the amplitude of said signal exceeds a threshold;
(c) means for determining a direction of movement of said railroad cars;
(d) means for processing said signals to determine which of said passing bearings are contained within a bearing housing and to distinguish signals responsive to (i) a scan of an inner sidewall of said bearing housing from a signal responsive to a scan of an outer sidewall of said bearing housing and (ii) a scan of a leading sidewall of said bearing housing from a signal responsive to a scan of a lagging sidewall of said bearing housing as defined by the direction of movement of the railroad cars; and
(e) means interconnecting said last mentioned means and said alarm monitor for adjusting said alarm as a function of whether said inner sidewall or outer sidewall is being scanned and whether said leading or lagging sidewall is being scanned.

5. A railroad car hot box detector system comprising:
(a) radiant energy responsive scanner means positioned along a section of track and adapted to scan the bearings of passing railroad cars in a preselected direction and to generate signals in response thereto, said signals including portions thereof having an amplitude and waveform indicative of the passing of a wheel bearing, the type of bearing, the temperature of said bearing and whether or not said bearing is enclosed within a bearing housing;
(b) an alarm monitor connected to said scanner for generating an alarm in the event the amplitude of said signal exceeds a threshold;
(c) means for processing said signals to determine which of said passing bearings are contained within a bearing housing;
(d) means for determining the direction of travel of said train; and,
(e) means for adjusting said alarm monitor threshold as a function of whether the side wall of a bearing housing being scanned is a leading or a lagging housing.

6. The invention in accordance with claim 5 further comprising means to distinguish signals responsive to a scan of an inner sidewall of said bearing housing from a signal responsive to a scan of an outer sidewall of said bearing house.

7. The invention in accordance with claim 6, including means for determining the speed of said train connected to said adjusting means in controlling relationship whereby the amount of adjustment of said threshold is a function of said train speed.

* * * * *